(12) United States Patent
Choo et al.

(10) Patent No.: US 11,240,732 B2
(45) Date of Patent: Feb. 1, 2022

(54) METHOD AND DEVICE FOR MANAGING MOBILE NODE OF SDN CONTROLLER

(71) Applicant: RESEARCH & BUSINESS FOUNDATION SUNGKYUNKWAN UNIVERSITY, Suwon-si (KR)

(72) Inventors: Hyun Seung Choo, Gwacheon-si (KR); Young Kyoung Kim, Seongnam-si (KR); Muhammad Raza Syed, Suwon-si (KR); Se Il Jeon, Seoul (KR); Tien Dung Nguyen, Suwon-si (KR); Jae Yeop Jeong, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 17/051,887

(22) PCT Filed: May 2, 2019

(86) PCT No.: PCT/KR2019/005291
§ 371 (c)(1),
(2) Date: Oct. 30, 2020

(87) PCT Pub. No.: WO2019/212268
PCT Pub. Date: Nov. 7, 2019

(65) Prior Publication Data
US 2021/0127320 A1    Apr. 29, 2021

(30) Foreign Application Priority Data
May 2, 2018   (KR) .......................... 10-2018-0050728

(51) Int. Cl.
*H04W 40/36*   (2009.01)
*H04L 12/721*  (2013.01)
(Continued)

(52) U.S. Cl.
CPC ............. *H04W 40/36* (2013.01); *H04L 45/38* (2013.01); *H04L 45/64* (2013.01); *H04L 45/745* (2013.01); *H04L 61/305* (2013.01); *H04W 80/04* (2013.01)

(58) Field of Classification Search
CPC ...... H04W 40/36; H04W 80/04; H04L 45/38; H04L 45/64; H04L 45/745; H04L 61/305
See application file for complete search history.

(56) References Cited

U.S. PATENT DOCUMENTS 6,466,985 B1 * 10/2002 Goyal ..................... H04L 45/00
                                                     370/236
8,854,965 B1 * 10/2014 Richards ............. H04L 47/2475
                                                     370/235

(Continued)

FOREIGN PATENT DOCUMENTS

JP     2009-500876 A   1/2009
KR     10-1491948 B1   2/2015
(Continued)

OTHER PUBLICATIONS

Kim, Youngkyoung, et al. "Towards On-Demand Mobility Management in SDN", *Proceedings of the 12th International Conference on Ubiquitous Information Management and Communication*. 2018 (pp. 1-6).

(Continued)

*Primary Examiner* — Mohamed A Kamara
(74) *Attorney, Agent, or Firm* — NSIP Law (57) ABSTRACT

A method for managing a mobile node of an SDN controller according to an aspect of the present disclosure includes receiving a router solicitation message of a mobile node transmitted through a first AP operated by the SDN controller.

11 Claims, 7 Drawing Sheets

(51) Int. Cl.
*H04L 12/715* (2013.01)
*H04L 12/741* (2013.01)
*H04L 29/12* (2006.01)
*H04W 80/04* (2009.01)

(56) References Cited

U.S. PATENT DOCUMENTS

| | | | |
|---|---|---|---|
| 9,716,653 B2* | 7/2017 | Gage | H04L 47/18 |
| 10,425,327 B2* | 9/2019 | Civanlar | H04L 45/64 |
| 2011/0134869 A1* | 6/2011 | Hirano | H04W 8/26 |
| | | | 370/329 |

FOREIGN PATENT DOCUMENTS

| | | | |
|---|---|---|---|
| KR | 10-2015-0058287 A | 5/2015 | |
| KR | 10-1686186 B1 | 12/2016 | |
| KR | 10-1779178 B1 | 9/2017 | |

OTHER PUBLICATIONS

International Search Report dated Sep. 20, 2019 in counterpart International Patent Application No. PCT/KR2019/005291 (2 pages in English and 2 pages in Korean).

* cited by examiner

| Host ID | AP ID | Prefix1 | Prefix2 | Flow using prefix1 | Flow using prefix2 |
|---|---|---|---|---|---|
| HostId | DeviceId | Ip6prefix1 | | Flow1 | |

| Host ID | AP ID | Prefix1 | Prefix2 | Flow using prefix1 | Flow using prefix2 |
|---|---|---|---|---|---|
| HostId | DeviceId | Ip6prefix1 | Ip6prefix2 | Flow1 | Flow2 |

METHOD AND DEVICE FOR MANAGING MOBILE NODE OF SDN CONTROLLER

CROSS-REFERENCE TO RELATED APPLICATIONS

This application is the National Stage filing under 35 U.S.C. 371 of International Application No. PCT/KR2019/005291, filed on May 2, 2019, Korean Patent Application No. 10-2018-0050728, filed on May 2, 2018, the contents of which are all hereby incorporated by reference herein in their entirety.

TECHNICAL FIELD

The present disclosure relates to a method and device capable of managing an SDN-based network more flexibly by distinguishing types of flows used in mobile nodes.

BACKGROUND ART

Recently, as the number of terminals using a network increases, services used by the terminals are also diversifying. In this environment, users want to stably provide high-quality services.

In an environment where the terminal does not move, the service can be stably provided, however, when the terminal performs a handover, it is difficult to provide continuous service because connection to an access point (AP) is temporarily disconnected.

In particular, in the case of real-time services, service disconnection causes great inconvenience to the users, so differentiated mobility management for each service is required to improve quality of experience (QoE).

In a software defined network (SDN) environment, IP mobility has to recalculate and configure a route for a flow generated by the terminal in a controller. In parts that the controller recalculates and configures, signaling cost and handover delay are incurred. In particular, since the handover delay is directly proportional to the number of active flows in the terminal, there is a problem that the signaling cost and handover delay inevitably increase as the number of flows increases.

DETAILED DESCRIPTION OF INVENTION

Technical Problem

An embodiment of the present disclosure is to solve the problems of the prior art described above, and distinguishes a flow used in a mobile node according to mobility requirements, and includes information relating to a flow type in an RS message, therefore, it is to provide a method and device capable of preferentially performing a handover for a flow requiring mobility based on information of the flow type by an SDN controller.

However, the technical problem to be achieved by the present embodiment is not limited to the technical problem as described above, and other technical problems may exist.

Technical Solution

As a technical means for achieving the above-described technical problem, a method for managing a mobile node of an SDN controller according to an aspect of the present disclosure, in a method for managing a mobile node of a software-defined networking (SDN) controller, includes receiving a router solicitation message of a mobile node transmitted through a first AP operated by the SDN controller; allocating a prefix to each flow based on information relating to a flow type included in the router solicitation message by the mobile node; storing the allocated prefix information in a binding cache entry (BCE) for each of the mobile node; transmitting a router advertisement message confirming that the information relating to the flow type is registered in the SDN controller to the mobile node through the first AP; and transmitting a flow transmitted in the mobile node to a destination node in accordance with the prefix information stored in the BCE, wherein, in the router solicitation message, information for distinguishing between a first type that does not require session maintenance of a flow recorded by the mobile node, a second type that requires the session maintenance of the flow, or a third type in which an IP of the flow is fixed is recorded, and the allocating the prefix allocates a first prefix to the first type and the third type of the flows, and allocates a second prefix to the second type of the flow.

In addition, a device for managing a mobile node of an SDN controller according to another embodiment of the present disclosure, in a device for managing a mobile node of a software-defined networking (SDN) controller, includes a memory in which a program for performing a method for managing the mobile node of the SDN controller is stored and a processor for executing the program stored in the memory, wherein the processor is configured to: allocate a prefix to each flow based on information relating to a flow type included in a router solicitation message of a mobile node transmitted through a first AP operated by the SDN controller by the executing of the program, store the allocated prefix information in a binding cache entry (BCE) for each of the mobile node, transmit a router advertisement message informing that the information relating to the flow type is registered to the mobile node through the first AP, transmit a flow transmitted in the mobile node to a destination node in accordance with the prefix information stored in the BCE, wherein, in the router solicitation message, information for distinguishing between a first type that does not require session maintenance of a flow recorded by the mobile node, a second type that requires the session maintenance of the flow, or a third type in which an IP of the flow is fixed is recorded, and wherein the processor is configured to allocate a first prefix to the first type and the third type of the flows, and allocate a second prefix to the second type of the flow.

Advantageous Effects

According to any one of the above-described problem solving means of the present disclosure, by adding information relating to the flow type to the RS message after distinguishing the type of flow according to the necessity of session maintenance, IP fixability, etc., the SDN controller can preferentially perform a handover for a flow requiring the session maintenance after registering the information relating to the flow type.

Accordingly, the SDN controller can reduce signaling cost and handover delay by preferentially processing only flows that cannot tolerate delay and requires session continuity, and will be able to perform more flexible management than the existing SDN-based network.

MODE FOR INVENTION

Hereinafter, embodiments of the present disclosure will be described in detail with reference to the accompanying drawings so that those of ordinary skill in the art may easily implement the present disclosure. However, the present disclosure may be implemented in various different forms and is not limited to the embodiments described herein. In order to clearly describe the present disclosure, parts irrelevant to the description are omitted in the drawings, and similar reference numerals are assigned to similar parts throughout the specification. In addition, while describing with reference to the drawings, the reference numbers may vary depending on the drawings even if the configuration is indicated by the same name, and the reference numbers are only provided for convenience of description and the concept, feature, function, or effect of each configuration is not limited and interpreted by the reference number.

Throughout the specification, when one part is said to be "connected" to another part, this includes not only "directly connected" but also "electrically connected" with another element interposed therebetween. In addition, when a part "includes" a certain component, this means that other components may be further included, rather than excluding the other components unless specifically described to the contrary, and it is to be understood that the possibility of existence or addition of one or more other features or numbers, steps, operations, elements, parts, or combinations thereof is not precluded.

In the present disclosure, the term 'part' or 'module' includes a unit realized by hardware or software, and a unit realized using both, one unit may be realized using two or more hardware, and two or more units may be realized by one piece of hardware.

Figure 1:
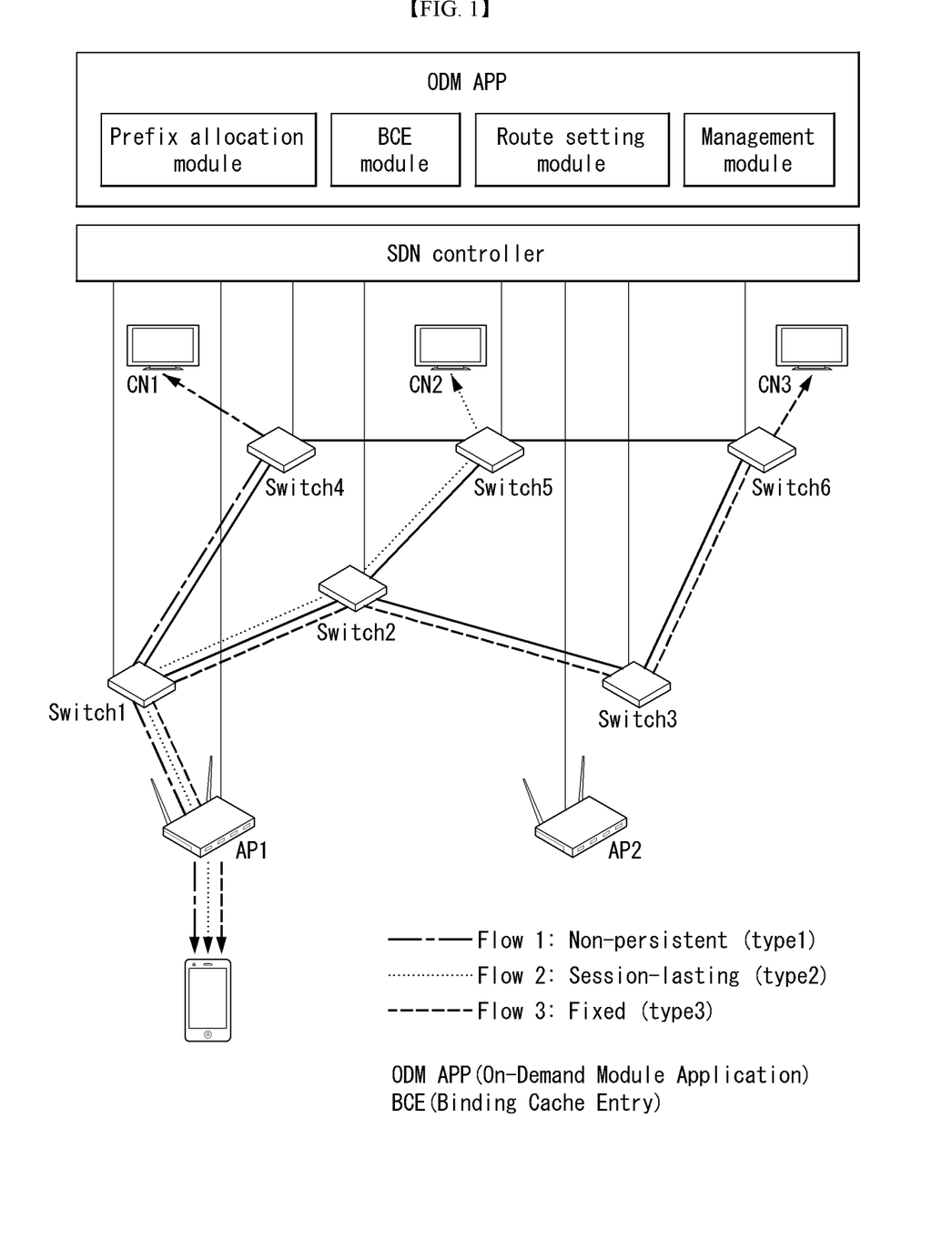
FIG. 1 is a diagram showing a system structure of an SDN controller according to an embodiment of the present disclosure.

FIG. 1 is a diagram showing a system structure of an SDN controller according to an embodiment of the present disclosure.

Referring to FIG. 1, a method proposed in the present disclosure operates in an SDN-based network environment, and the entire system includes an SDN controller, Open-Flow-enabled switches, and APs.

The SDN controller may manage a network more flexibly by distinguishing a flow type interworking with an on-demand module application used in a mobile node. The on-demand module application includes a management module, a route setting module, a binding cache entry (BCE) module, and a prefix allocation module.

First, when the mobile node accesses to an SDN domain, the management module detects connection of the mobile node (MN) and then determines content of movement. At this time, the management module detects the connection of the mobile node by using a router solicitation (RS) message, and when the mobile node is detected, it transmits a message to the module according to the mobility, and then generates a router advertisement (RA) message and notifies the mobile node.

The route setting module selects a route according to information relating to the flow type using information on a switch located in a current route between the mobile node and a destination node. The BCE module stores information on the mobile node and extends and uses the existing BCE to distinguish flows being used in the mobile node, which will be described later with reference to FIGS. 5, 7 and 9.

The prefix allocation module makes it possible to distinguish between the flows by allocating a different prefix to each flow being used in the mobile node.

In an embodiment of the present disclosure, the flows are largely divided into three types: it is divided into a first type which is a non-persistent service that does not require session maintenance of the flow, a second type which is a session-lasting service that requires the session maintenance of the flow and requires mobility, and a third type which is a fixed form in which an IP address must always remain valid. The prefix allocation module may allocate a first prefix to the first type and the third type of the flows, and allocates a second prefix to the second type of the flow that does not tolerate delay and requires session continuity.

Figure 2:
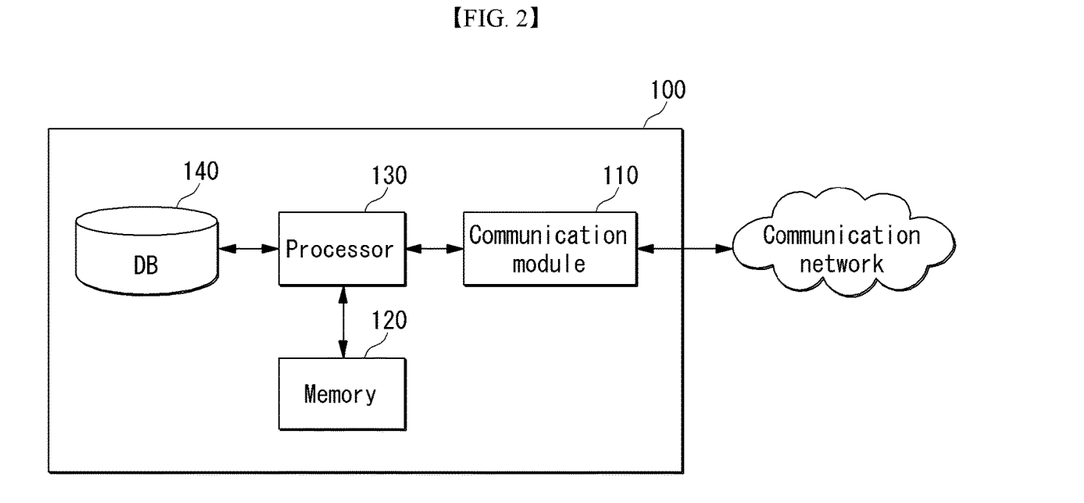
FIG. 2 is a diagram showing configuration of a device for managing a mobile node of an SDN controller according to an embodiment of the present disclosure.

FIG. 2 is a diagram showing configuration of a device for managing a mobile node of an SDN controller according to an embodiment of the present disclosure.

Referring to FIG. 2, a device 100 for managing a mobile node of an SDN controller includes a communication module 110, a memory 120, a processor 130, and a database 140.

In detail, the communication module 110 provides a communication interface necessary to provide a transmission/reception signal between a communication network and the device 100 for managing a mobile node of an SDN controller and a user terminal, that is, a mobile node in the form of packet data. Furthermore, the communication module 110 may receive a data request from the mobile node and transmit data as a response thereto.

Here, the communication module 110 may be a device including hardware and software necessary to transmit and receive signals such as control signals or data signals through wired or wireless connection with other network devices.

A program for performing a method for managing the mobile node of the SDN controller is recorded in the memory 120. Also, the memory 120 performs a function of temporarily or permanently storing data processed by the processor 130. Here, the memory 120 may include volatile storage media or non-volatile storage media, but the scope of the present disclosure is not limited thereto.

The processor 130 controls the entire process of providing the method for managing the mobile node of the SDN controller. Each step performed by the processor 130 will be described later with reference to FIGS. 3 and 10.

Here, the processor 130 may include all kinds of devices capable of processing data, such as a processor. Here, the 'processor' may mean a data processing device built into hardware, for example, having a circuit that is physically structured to perform a function represented by codes or instructions included within a program. As described above, as an example of the data processing device built into the hardware as described above, a processing device such as a microprocessor, a central processing unit (CPU), a processor core, a multiprocessor, an application-specific integrated circuit (ASIC), and a field programmable gate array (FPGA) may be covered, but the scope of the present disclosure is not limited thereto.

The database 140 stores data accumulated while the SDN controller performs the method for managing the mobile node.

For example, the database 140 may store a mobile node identifier, an identifier of an AP to which the mobile node is connected, information relating to each flow type, and the like.

Figure 3:
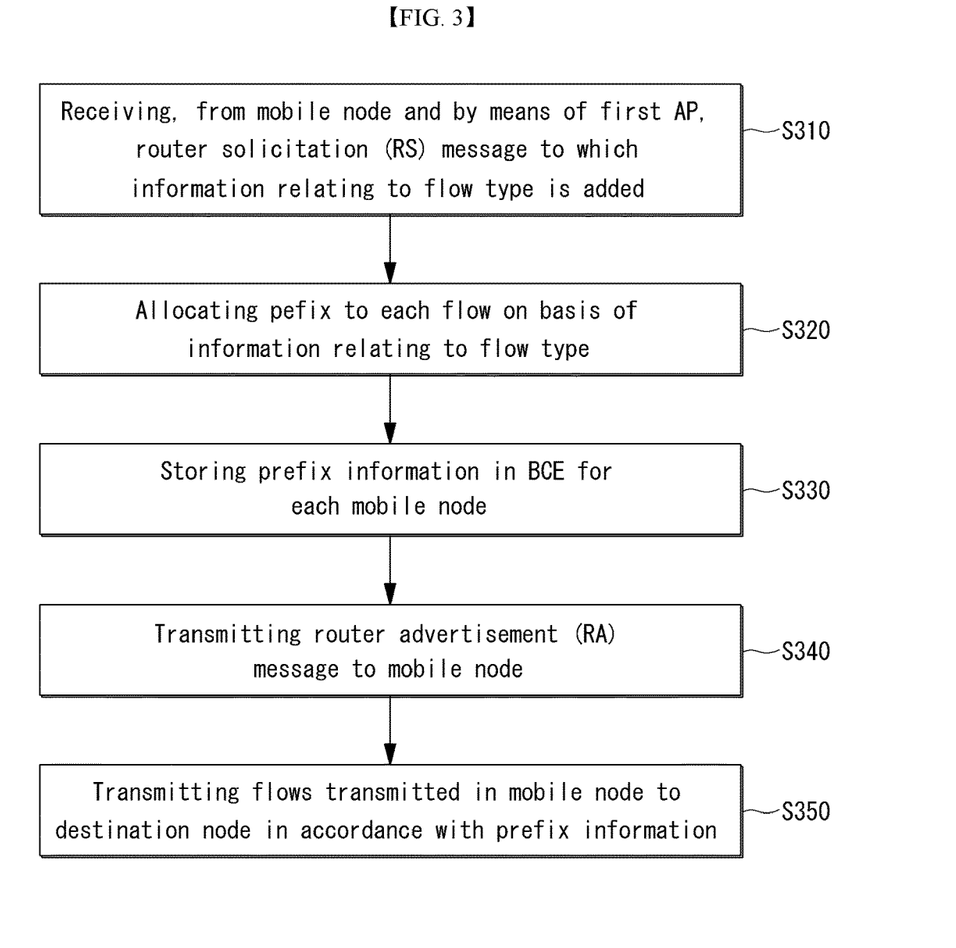
FIG. 3 is a flowchart illustrating a method for managing a mobile node of an SDN controller according to an embodiment of the present disclosure.

FIG. 3 is a flowchart illustrating a method for managing a mobile node of an SDN controller according to an embodiment of the present disclosure.

Referring to FIG. 3, the SDN controller receives a router solicitation (RS) message of a mobile node transmitted through a first AP operated by the SDN controller (S310). In this case, in the general RS message, a code field is defined as '0000' in the form of bytes, but the RS message according to an embodiment of the present disclosure is changed by defining information relating to a flow type in the code field. For example, in the code field of the RS message, a first type is defined as Flow1=0001, a second type is defined as Flow2=0002, and a third type is defined as Flow3=0003, respectively, and the mobile node records the information relating to the flow type.

The SDN controller allocates a prefix to each flow on the basis of the information relating to the flow type included in the RS message (S320). At this time, the SDN controller allocates a first prefix to the first type and the third type of the flows, and allocates a second prefix to the second type of the flow.

The SDN controller stores the prefix information allocated through step S320 in BCE for each of the mobile node (S330). The SDN controller transmits an RA message confirming that the information relating to the flow type is registered to the mobile node through the first AP (S340). In this case, the RA message is transmitted by defining the information relating to the flow type in the code field, similar to the RS message.

The SDN controller transmits a flow transmitted in the mobile node to a destination node in accordance with the prefix information stored in the BCE (S350). That is, based on the flow transmitted to the first AP, a packet-in message transmitted to the SDN controller by the first AP is received, the SDN controller sets a transmission route of the flow and sets an operation of a switch located in the transmission route, and the corresponding flow is transmitted to the destination node via the first AP and the set switch.

Figure 4:
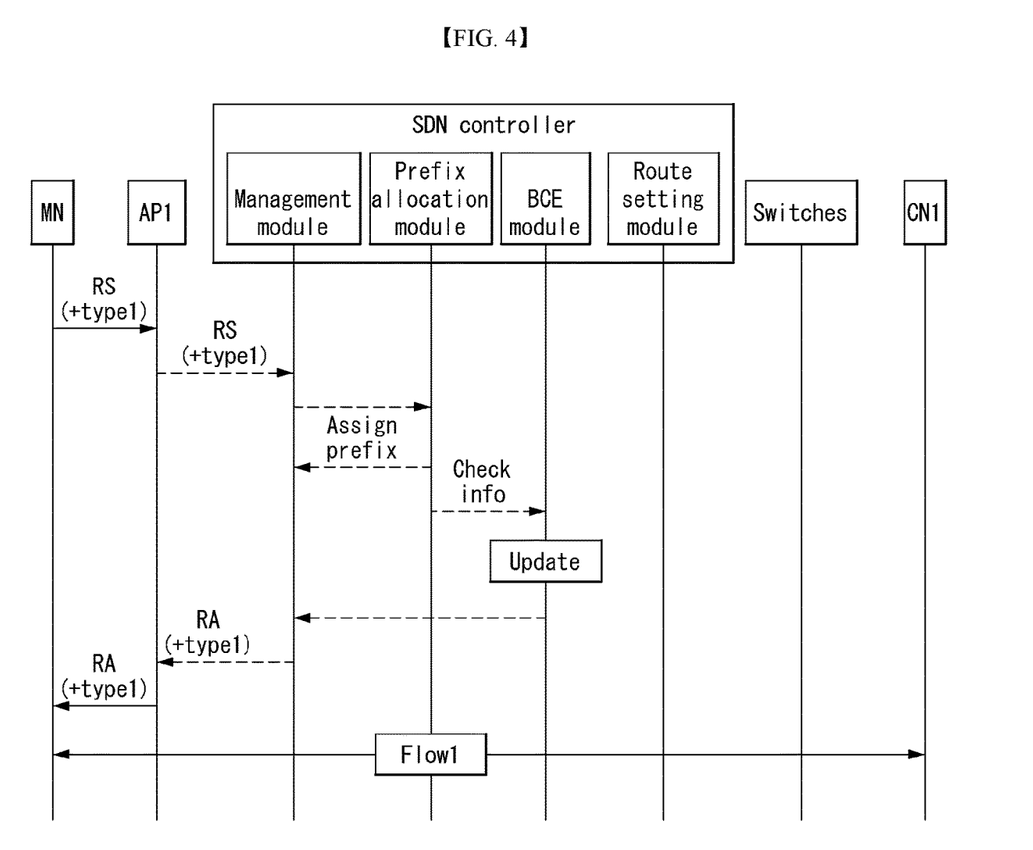
FIG. 4 is a flowchart showing a mobile node registration process according to an embodiment of the present disclosure.
Figure 5:
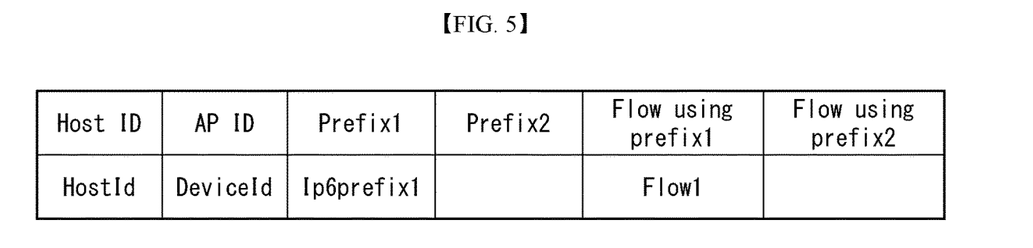
FIG. 5 is a diagram illustrating an updated state of the BCE according to FIG. 4.

FIG. 4 is a flowchart showing a mobile node registration process according to an embodiment of the present disclosure, and FIG. 5 is a diagram illustrating an updated state of the BCE according to FIG. 4.

Referring to FIG. 4, when a flow used in the mobile node (MN) is a first type of flow, the mobile node adds information of Flow1 to the RS message and transmits it to the SDN controller through the first AP (AP1).

A management module of the SDN controller detects connection of the mobile node through the RS message and transmits the RS message to the prefix allocation module. Since the information relating to the flow type included in the RS message is the first type, the prefix allocation module allocates the first prefix (Ip6prefix1) and transmits it to the BCE module, and the BCE module stores the prefix information allocated by the prefix allocation module in the BCE.

The BCE module stores a host identifier (HostID), an AP identifier (AP ID), a prefix (Prefix1, Prefix2), and the information relating to the flow type (Flow1, Flow2, Flow3) in the BCE. Since the flow transmitted from the mobile node is the first type, as shown in FIG. 5, the BCE module updates and stores the host identifier (Hostid), the AP identifier (Devicedid), the first prefix (Ip6prefix1), and the information relating to the flow using the first prefix (Flow1).

The management module generates an RA message confirming that the information relating to the flow type is registered at the SDN controller and transmits it to the mobile node.

The SDN controller transmits a flow (Flow1) transmitted in the mobile node to a destination node CN1 in accordance with the prefix information (Ip6prefix1) stored in the BCE.

On the other hand, Flow1 transmitted in the mobile node through the first AP may be transmitted to the destination node CN1, and at the same time, a different type or the same type of flow, that is, Flow2 or Flow3 may be used in the same mobile node.

Figure 6:
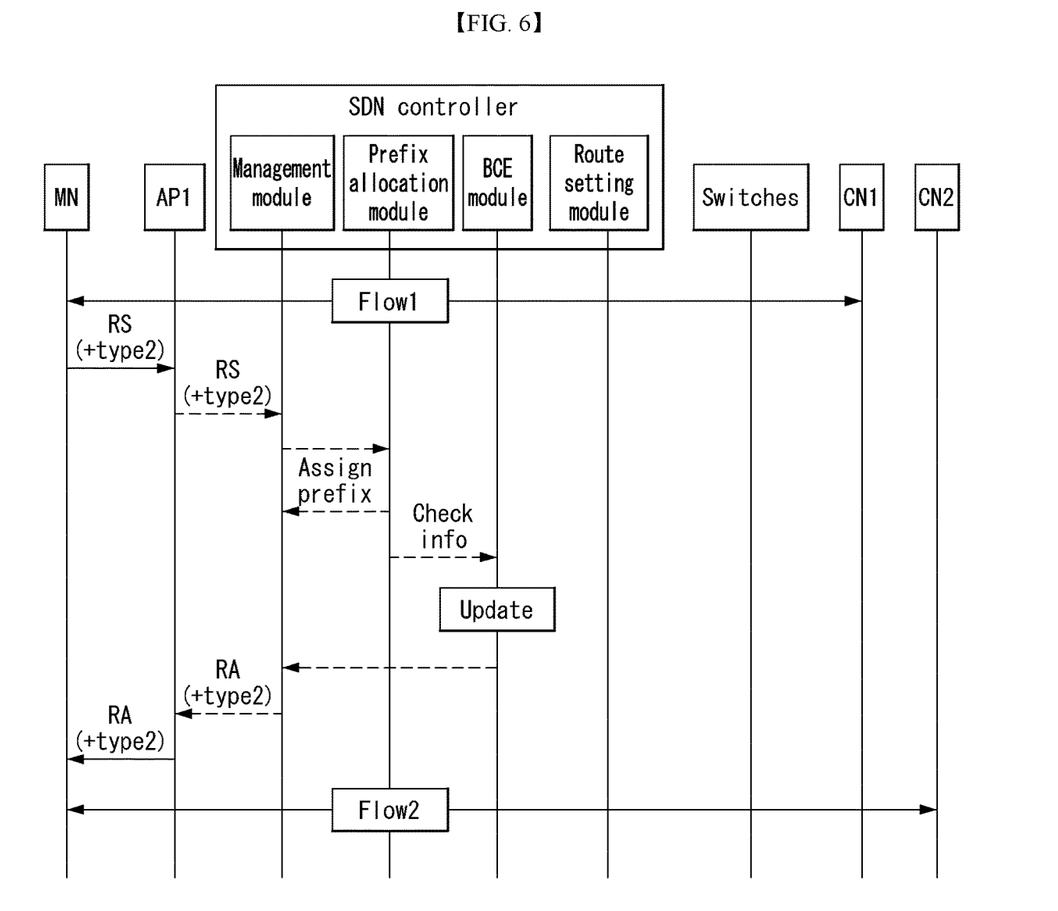
FIG. 6 is a flowchart showing a process of using a different type of flow in the same terminal according to an embodiment of the present disclosure.
Figure 7:
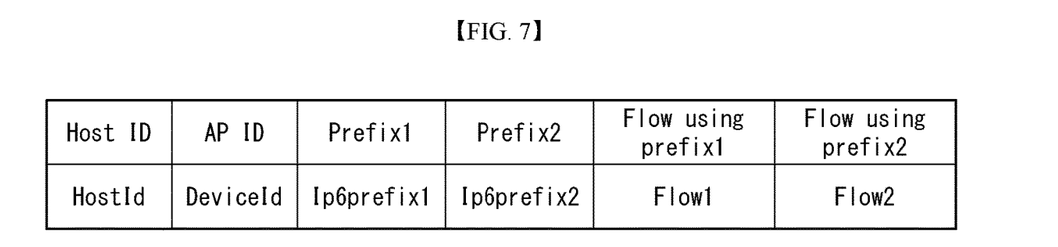
FIG. 7 is a diagram illustrating an updated state of the BCE according to FIG. 6.

FIG. 6 is a flowchart showing a process of using a different type of flow in the same terminal according to an embodiment of the present disclosure, and FIG. 7 is a diagram illustrating an updated state of the BCE according to FIG. 6.

Referring to FIG. 6, the SDN controller transmits Flow1 transmitted in the mobile node through the first AP to the destination node CN1, and receives an RS message of the mobile node transmitted through the first AP.

The SDN controller allocates a prefix based on the information relating to the flow type included in the RS message in the same manner as the operation procedure described in FIG. 6, and stores the allocated prefix information in the BCE. For example, a streaming video may be used while using a messenger function in the mobile node. In this case, a flow type for the messenger function may be a first type that does not require session maintenance, and a flow type for the streaming video may be a second type that requires the session maintenance.

As shown in FIG. 7, the SDN controller updates and stores information relating to the flow using the second prefix (Ip6prefix2) and the second prefix (Flow2) in the BCE state of FIG. 5.

The SDN controller transmits the RA message to the mobile node through the first AP, and transmits Flow2 transmitted in the mobile node to the destination node CN2 through the first AP according to the second prefix information stored in the BCE.

As described above, after the first type of flow is generated in the terminal, the second type of flow may be used in the same terminal, so that the SDN-based network may be managed more flexibly.

Figure 8:
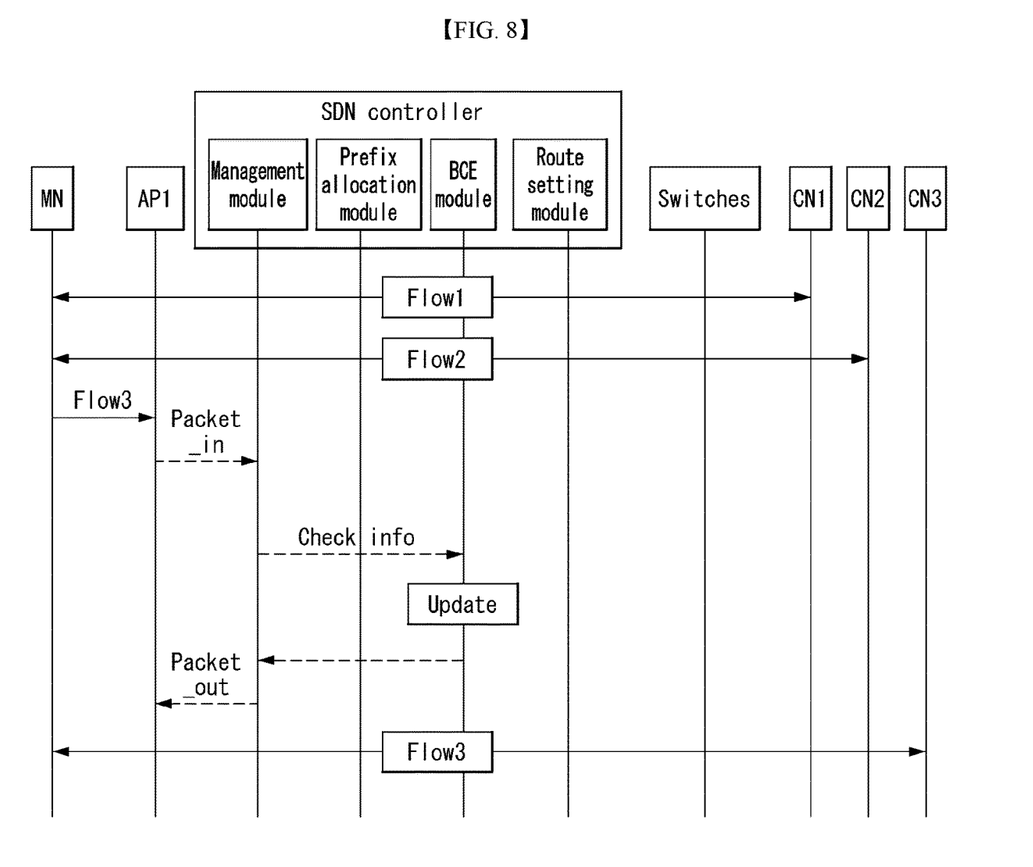
FIG. 8 is a flowchart showing a process of using the same type of flow in the same terminal according to an embodiment of the present disclosure.
Figure 9:
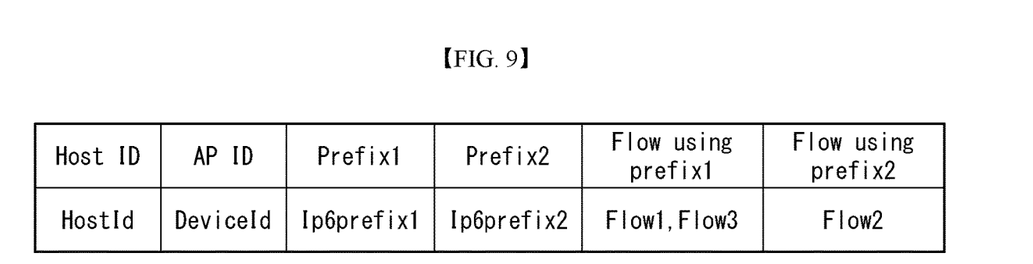
FIG. 9 is a diagram illustrating an updated state of the BCE according to FIG. 8.

FIG. 8 is a flowchart showing a process of using the same type of flow in the same terminal according to an embodiment of the present disclosure, and FIG. 9 is a diagram illustrating an updated state of the BCE according to FIG. 8.

Referring to FIG. 8, the SDN controller transmits Flow1 transmitted in the mobile node through the first AP to the destination node CN1, and transmits Flow2 to CN2. During this process, Flow3, which is the same type as Flow1, may be received. For example, a streaming video may be used while using a messenger function and Internet search in the mobile node. In this case, the flow type for the messenger function may be a first type that does not require session maintenance, the flow type for the streaming video may be a second type that requires the session maintenance, and the flow type for Internet search may be a third type in which IP is fixed.

Since the SDN controller has been allocated the first prefix (Ip6prefix1) in the process of setting Flow1, the process of being allocated the prefix for Flow3, which is a third type of flow, may be omitted.

Accordingly, the mobile node transmits a packet-in message to the SDN controller without a prefix allocation process, and the SDN controller transmits a response message including an address of the destination node to the first AP in the form of a packet-out message. Therefore, the SDN controller transmits Flow3 transmitted from the mobile node to the destination node CN3.

As shown in FIG. 9, the SDN controller stores Flow1 and Flow3 together by adding Flow3 to the information relating to the flow using the first prefix in the BCE state of FIG. 7.

Figure 10:
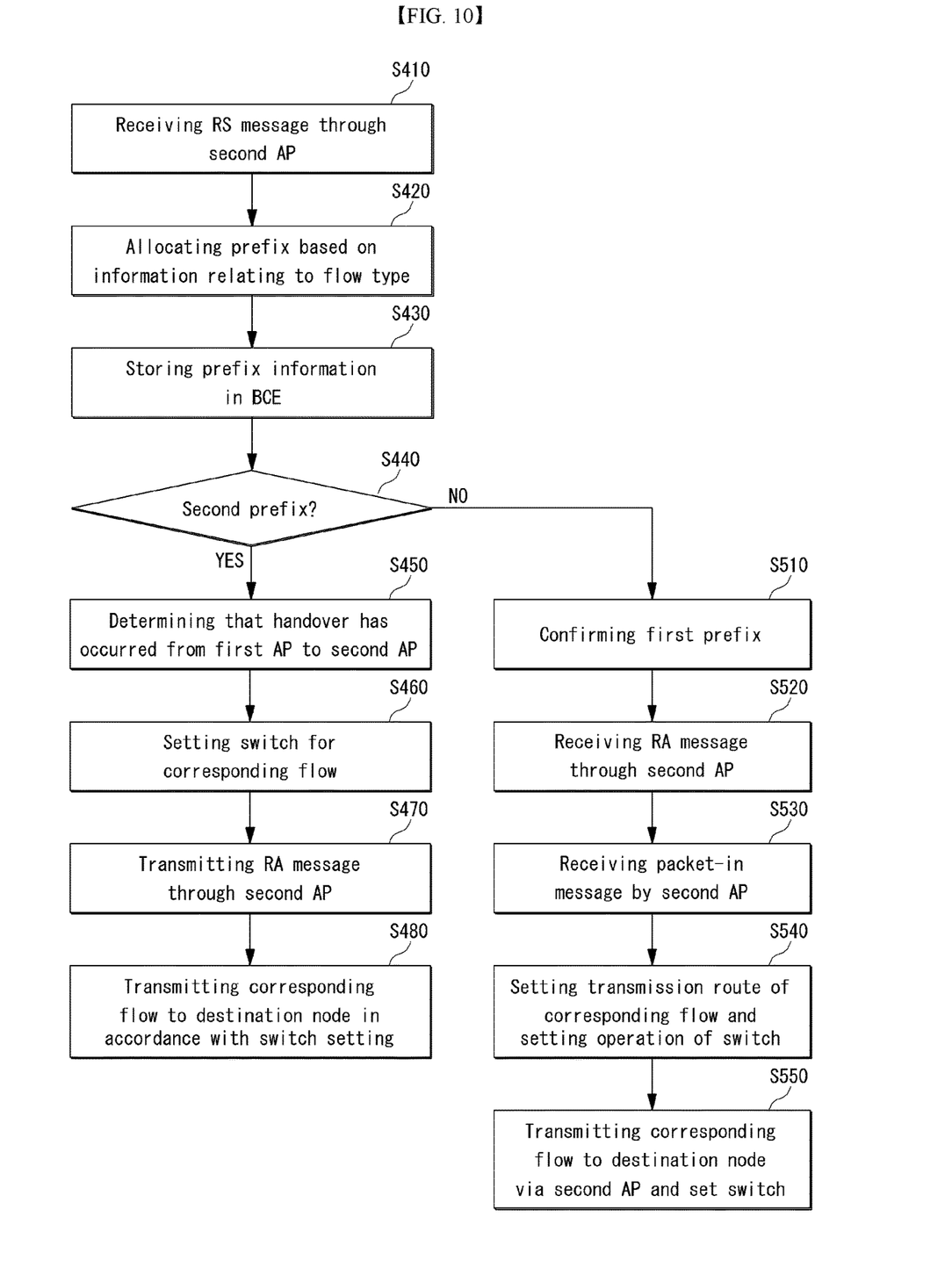
FIG. 10 is a flowchart illustrating a handover process in a method for managing a mobile node of an SDN controller according to an embodiment of the present disclosure.

FIG. 10 is a flowchart illustrating a handover process in a method for managing a mobile node of an SDN controller according to an embodiment of the present disclosure.

Referring to FIG. 10, when the SDN controller receives an RS message transmitted from a mobile node through a second AP, it allocates a prefix to each flow based on information relating to a flow type included in the RS message. (S410, S420).

The SDN controller stores the prefix information in the BCE, and when the prefix information indicates the second prefix, it is determined that a handover has occurred from the first AP to the second AP in the mobile node (S430, S440, S450). The SDN controller sets a switch so that a flow in which the handover has occurred may be transmitted to an original destination, and transmits an RA message to the mobile node through the second AP (S460, S470).

Thereafter, the SDN controller transmits a flow transmitted in the mobile node through the second AP to the destination node via the set switch (S480). As described above, the SDN controller maintains the IP address for Flow2, which should maintain the session, so that the flow can be transmitted.

On the other hand, when the prefix information is the first prefix, the SDN controller transmits an RA message to the mobile node through the second AP, based on the flow transmitted from the mobile node through the second AP, the second AP receives a packet-in message transmitted to the SDN controller (S510, S520, S530). The SDN controller sets a transmission route of the flow and an operation of a switch located in the transmission route (S540).

From the mobile node the flow is transmitted to the destination node via the second AP and the set switch (S550).

Figure 11:
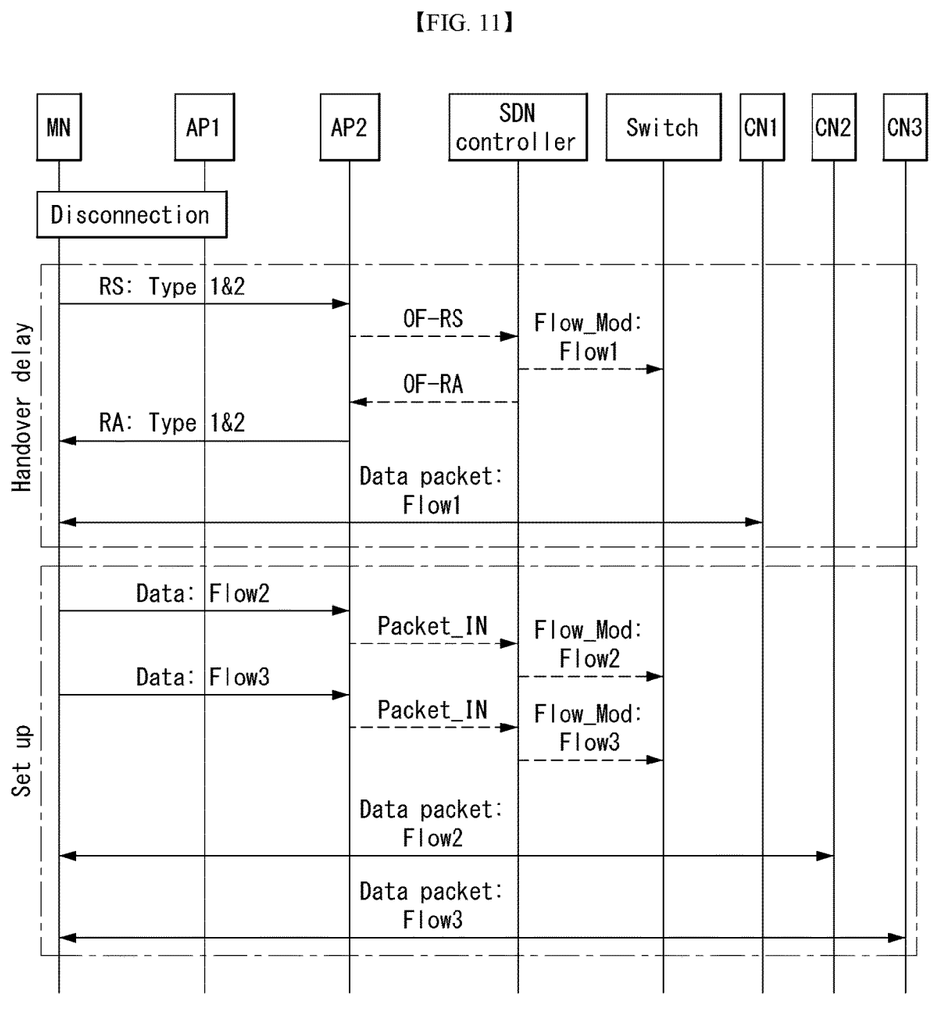
FIG. 11 is a flowchart illustrating a handover process of a mobile node according to an embodiment of the present disclosure.

FIG. 11 is a flowchart illustrating a handover process of a mobile node according to an embodiment of the present disclosure.

Referring to FIG. 11, a mobile node notifies an SDN controller which IP addresses are currently in use by different flows during a handover through an RS message. When the SDN controller receives the RS message transmitted from the mobile node through a second AP, the SDN controller allocates a prefix to each flow based on information relating to a flow type included in the RS message and then stores the allocated prefix information in the BCE.

When the prefix information is a second prefix, the SDN controller determines that the handover has occurred from a first AP to the second AP, in the case of the first type of flow (Flow1) that does not require maintaining a session, the SDN controller transmits the RA message to the mobile node through the second AP, and transmits Flow1 transmitted in the mobile node to a destination node through the second AP.

On the other hand, the SDN controller maintains the IP address for the second type of flow (Flow2) that must maintain the session when there is an access request for each flow of the mobile node, the third type of flow (Flow3) with fixed IP so that the flow is transmitted. That is, based on the flow transmitted to the second AP, the second AP receives a packet-in message transmitted to the SDN controller, and the SDN controller sets a transmission route of the flow and an operation of a switch located in the transmission route, and then causes the flow to be transmitted to the destination node via the second AP and the set switch.

As described above, the SDN controller determines the route to Flow2 as sensitive to delay and sets the transmission route of Flow2, thereby controlling signaling costs during the handover while reducing handover delay. In addition, the SDN controller ignores the setting of a new route for the remaining flows for which session continuity is not required, and stores the IP address for each flow (Flow1, Flow2, Flow3) during the handover, and the prefix information for the flow using the corresponding IP address.

The method for managing the mobile node of the SDN controller according to the embodiment of the present disclosure described above may be implemented in the form of recording media including instructions executable by a computer, such as a program module executed by the computer. Such recording media include computer-readable media, the computer-readable media may be any available media that can be accessed by the computer, and include both volatile and nonvolatile media, and removable and non-removable media. In addition, the computer-readable media include computer storage media, which include both volatile and nonvolatile, removable and non-removable media implemented by any method or technology for storage of information such as computer readable instructions, data structures, program modules or other data.

The above description of the present disclosure is for illustrative purposes only, and those of ordinary skill in the art to which the present disclosure pertains will understand that it is possible to easily transform into other specific forms without changing the technical spirit or essential features of the present disclosure. Therefore, it should be understood that the embodiments described above are illustrative in all respects and not limiting. For example, each component described as a single type may be distributed and implemented, and similarly, components described as being distributed may be implemented in a combined form.

In addition, although the methods and systems of the present disclosure have been described with reference to specific embodiments, some or all of their components or operations may be implemented using a computer system having a general-purpose hardware architecture.

The scope of the present disclosure is indicated by the claims to be described later rather than the detailed description, and all changes or modified forms derived from the meaning and scope of the claims and their equivalent concepts should be interpreted as being included in the scope of the present disclosure.

The invention claimed is:

1. A method for managing a mobile node of a software-defined networking (SDN) controller, comprising:
   receiving a router solicitation message of a mobile node transmitted through a first AP operated by the SDN controller;
   allocating a prefix to each flow based on information relating to a flow type included in the router solicitation message by the mobile node;
   storing the allocated prefix information in a binding cache entry (BCE) for each of the mobile node;
   transmitting a router advertisement message confirming that the information relating to the flow type is registered in the SDN controller to the mobile node through the first AP; and
   transmitting a flow transmitted in the mobile node to a destination node in accordance with the prefix information stored in the BCE,
   wherein, in the router solicitation message, information for distinguishing between a first type that does not require session maintenance of a flow recorded by the mobile node, a second type that requires the session maintenance of the flow, or a third type in which an IP of the flow is fixed is recorded, and
   the allocating the prefix allocates a first prefix to the first type and the third type of the flows, and allocates a second prefix to the second type of the flow.

2. The method of claim 1, wherein the storing in the BCE is to match and store information relating to a flow type transmitted by the mobile node with respect to an identifier of the mobile node, an identifier of the first AP to which the mobile node is connected, and the flow.

3. The method of claim 1, wherein the transmitting the flow to the destination node includes:
   receiving, based on the flow transmitted to the first AP, a packet-in message transmitted to the SDN controller by the first AP;
   setting a transmission route of the flow by the SDN controller and setting an operation of a switch located in the transmission route; and
   transmitting the flow to the destination node via the first AP and the set switch.

4. The method of claim 1, wherein the method includes:
   receiving a router solicitation message of a mobile node transmitted through a second AP operated by the SDN controller;
   allocating a prefix to each flow based on information relating to a flow type included in the router solicitation message by the mobile node;
   storing the allocated prefix information in the BCE for each of the mobile node;
   when the prefix information indicates the second prefix, determining that a handover has occurred from the first AP to the second AP, and setting a switch so that a corresponding flow is transmitted to an original destination;
   transmitting a router advertisement message confirming that the information relating to the flow type is registered in the SDN controller to the mobile node through the second AP; and
   transmitting a flow transmitted in the mobile node through the second AP to the destination node in accordance with the switch setting.

5. The method of claim 1, wherein the method includes:
   receiving a router solicitation message of a mobile node transmitted through a second AP operated by the SDN controller;
   allocating a prefix to each flow based on information relating to a flow type included in the router solicitation message by the mobile node;
   storing the allocated prefix information in the BCE for each of the mobile node;
   when the prefix information indicates the first prefix,
   transmitting a router advertisement message confirming that the information relating to the flow type is registered in the SDN controller to the mobile node through the second AP; and
   receiving, based on the flow transmitted to the second AP, a packet-in message transmitted to the SDN controller by the second AP;
   setting a transmission route of the flow and setting an operation of a switch located in the transmission route by the SDN controller; and
   transmitting the flow to the destination node via the second AP and the set switch.

6. The method of claim 1, wherein the router solicitation message adds the information relating to the flow type to a code field.

7. A device for managing a mobile node of a software-defined networking (SDN) controller, comprising:
   a memory in which a program for performing a method for managing the mobile node of the SDN controller is stored and
   a processor for executing the program stored in the memory,
   wherein the processor is configured to:
   allocate a prefix to each flow based on information relating to a flow type included in a router solicitation message of a mobile node transmitted through a first AP operated by the SDN controller by the executing of the program,
   store the allocated prefix information in a binding cache entry (BCE) for each of the mobile node,
   transmit a router advertisement message informing that the information relating to the flow type is registered to the mobile node through the first AP,
   transmit a flow transmitted in the mobile node to a destination node in accordance with the prefix information stored in the BCE,
   wherein, in the router solicitation message, information for distinguishing between a first type that does not require session maintenance of a flow recorded by the mobile node, a second type that requires the session maintenance of the flow, or a third type in which an IP of the flow is fixed is recorded, and
   wherein the processor is configured to allocate a first prefix to the first type and the third type of the flows, and allocate a second prefix to the second type of the flow.

8. The device of claim 7, wherein the processor is configured to:
   receive a router solicitation message of a mobile node transmitted through a second AP operated by the SDN controller by the executing of the program,
   allocate a prefix to each flow based on information relating to a flow type included in the router solicitation message, store the allocated prefix information in the BCE for each of the mobile node, when the prefix information indicates the second prefix, determine that a handover has occurred from the first AP to the second AP of the mobile node, set a switch so that a corresponding flow is transmitted to an original destination, and then transmit a router advertisement message to the mobile node through the second AP, and perform a handover function of transmitting a flow transmitted in the mobile node through the second AP to the destination node in accordance with the switch setting.

9. The device of claim 8, wherein the processor, when the prefix information indicates the first prefix, is configured to:

transmit the router advertisement message to the mobile node through the second AP, receive, based on the flow transmitted to the second AP, a packet-in message transmitted to the SDN controller by the second AP, set a transmission route of the flow and set an operation of a switch located in the transmission route by the SDN controller, and transmit the flow to the destination node via the second AP and the set switch.

10. The device of claim 7, wherein the processor is configured to:

when using the second type of the flow after the first type of the flow is generated in the mobile node, allocate the second prefix to the second type of the flow, store the allocated prefix information in the BCE, transmit the RA message to the mobile node through the first AP, and transmit the second type of the flow transmitted in the mobile node to the destination node through the first AP in accordance with the prefix information stored in the BCE.

11. The device of claim 7, wherein based on the processor using the third type of the flow after the first type of the flow and the second type of the flow being generated in the mobile node;

the SDN controller adds information relating to the third type of the flow to the BCE, after the mobile node transmits the packet-in message to the SDN controller through the first AP, and the SDN controller transmits a packet-out message including an address of the destination node to the first AP, the SDN controller transmits the third type of the flow transmitted from the mobile node to the destination node.

\* \* \* \* \*